(12) United States Patent
Wittbold et al.

(10) Patent No.: US 6,494,609 B1
(45) Date of Patent: Dec. 17, 2002

(54) SLURRY MIXER OUTLET

(75) Inventors: James R. Wittbold, Des Plaines, IL (US); Amit P. Duvedi, Morton Grove, IL (US); Mark K. Hemphill, Jarvis (CA); Wayne A. Fleming, Fisherville (CA); Wilford Gary Pittman, Fernandina, FL (US); Kirk S. Moore, Jacksonville, FL (US); Christopher Nelson, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 09/905,553

(22) Filed: Jul. 16, 2001

(51) Int. Cl.⁷ .............................. B01F 7/16; B01F 15/02
(52) U.S. Cl. ..................... 366/192; 366/194; 366/315
(58) Field of Search ................................. 366/194, 196, 366/192, 190, 315

(56) References Cited

U.S. PATENT DOCUMENTS

| | | | |
|---|---|---|---|
| 1,500,452 A | | 7/1924 | Haggerty |
| 2,207,339 A | | 7/1940 | Camp |
| 2,985,219 A | | 5/1961 | Summerfield |
| 3,173,663 A | * | 3/1965 | Schoonover |
| 3,343,818 A | | 9/1967 | Plemons et al. |
| 4,009,062 A | | 2/1977 | Long |
| 4,176,972 A | * | 12/1979 | Stiling |
| 4,279,673 A | | 7/1981 | White et al. |
| 4,288,263 A | | 9/1981 | Delcoigne et al. |
| 4,354,885 A | | 10/1982 | White |
| 4,364,790 A | | 12/1982 | Delcoigne et al. |
| 4,812,045 A | * | 3/1989 | Rivers |
| 4,820,053 A | * | 4/1989 | Rivers |
| 5,071,257 A | * | 12/1991 | Hasenpath et al. |
| 5,643,510 A | | 7/1997 | Sucech |
| 5,683,635 A | | 11/1997 | Sucech et al. |
| 5,718,797 A | | 2/1998 | Phillips et al. |
| 6,019,919 A | | 2/2000 | Sulzbach et al. |
| 6,059,444 A | * | 5/2000 | Johnson et al. |
| 6,193,408 B1 | * | 2/2001 | Miura et al. |

* cited by examiner

Primary Examiner—Tony G. Soohoo
(74) Attorney, Agent, or Firm—Greer, Burns & Crain, Ltd.; John M. Lorenzen; David F. Janci

(57) ABSTRACT

An apparatus and method for delivering an additive-enhanced slurry for use in making gypsum wallboard, and configured for connection to a centrifugal mixer with a tangential discharge outlet, includes a conduit having a main inlet in slurry receiving communication with the mixer outlet and extending to a discharge spout for discharging the slurry proximate a wallboard forming area. At least one volume restrictor is associated with the conduit for creating back pressure between the volume restrictor and the outlet for keeping the mixer fill, and at least one pressure reducer associated with the discharge spout and configured for reducing the pressure of the slurry dispensed from the discharge spout. The apparatus is configured for maintaining a generally laminar flow from the mixer outlet to the discharge spout.

21 Claims, 4 Drawing Sheets

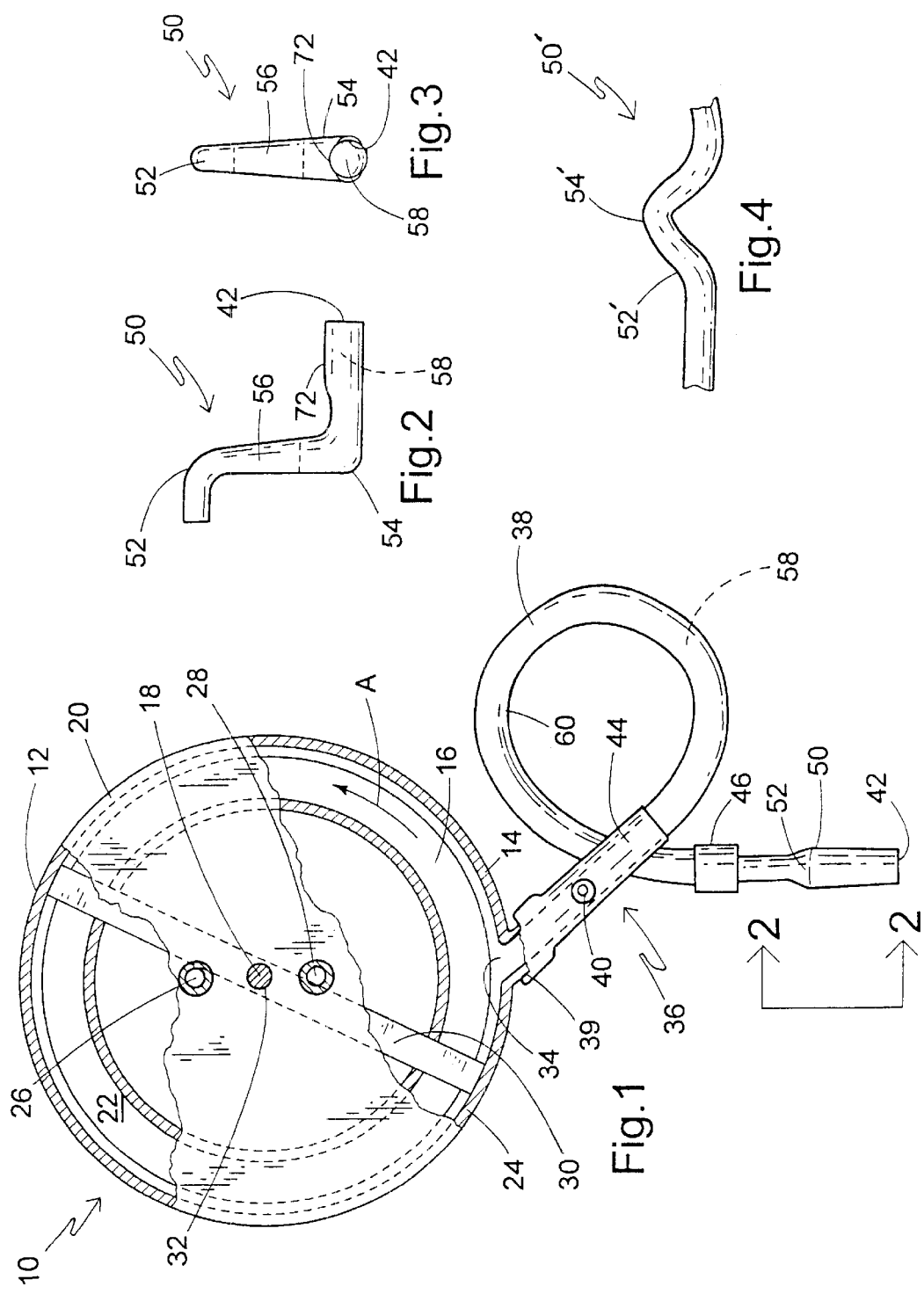

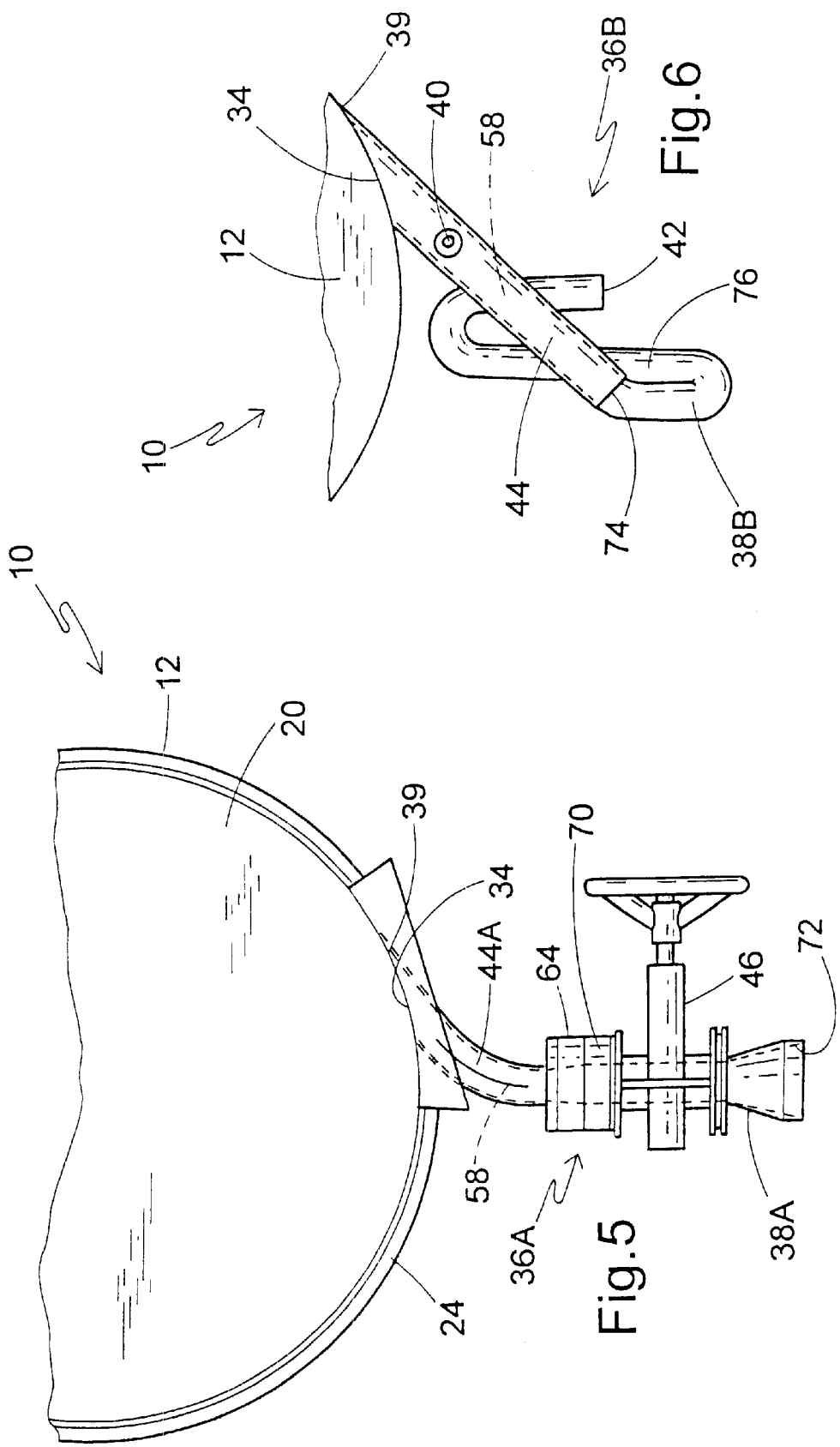

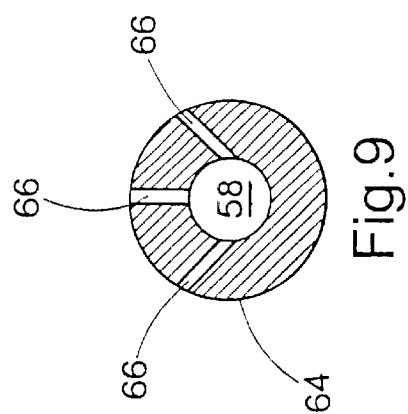
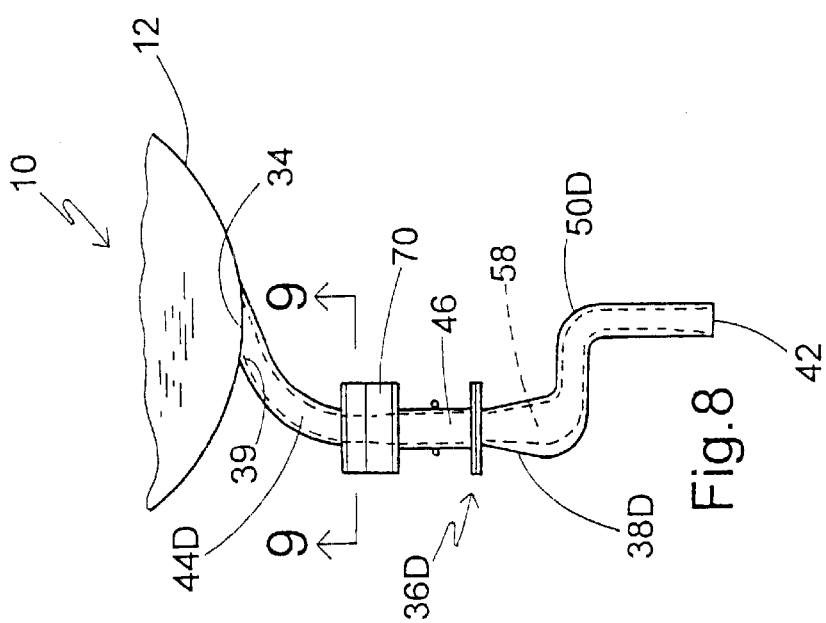
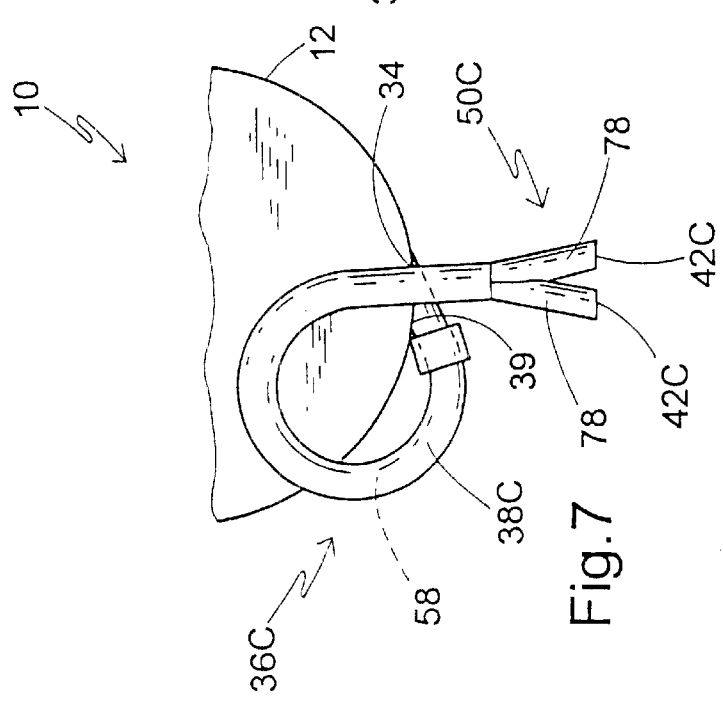

SLURRY MIXER OUTLET

BACKGROUND OF THE INVENTION

The present invention relates to a method and apparatus for preparing gypsum products (i.e., products comprising calcium sulfate dihydrate) from starting materials comprising calcined gypsum (i.e., calcium sulfate hemihydrate or anhydrite) and water. More particularly, the present invention relates to an improved apparatus for use in conjunction with the slurry mixer typically used in supplying agitated gypsum slurry to a wallboard production line. The basic technology of gypsum wallboard manufacture is disclosed in U.S. Pat. Nos. 1,500,452; 2,207,339; and 4,009,062 all of which are incorporated by reference herein. The present apparatus provides an improved mixing chamber which enhances the uniform mixing of foam into the gypsum slurry.

It is well known to produce gypsum products by uniformly dispersing calcined gypsum in water to form a slurry and then casting the slurry into a desired shaped mold or onto a surface and allowing the slurry to set to form hardened gypsum by reaction of the calcined gypsum (calcium sulfate hemihydrite or anhydrite) with the water to form hydrated gypsum (calcium sulfate dihydrate). It is also well known to produce a lightweight gypsum product by uniformly mixing an aqueous foam into the slurry to produce air bubbles. This will result in a uniform distribution of voids in the set gypsum product if the bubbles do not escape from the slurry before the hardened gypsum forms. The voids lower the density of the final product, which is often referred to as "foamed gypsum".

Prior apparatus and methods for addressing some of the operational problems associated with the production of foamed gypsum are disclosed in commonly-assigned U.S. Pat. Nos. 5,638,635 and 5,643,510, which are incorporated by reference. The present invention relates generally to the use of foamed gypsum in the production of gypsum wallboard.

A gypsum wallboard mixer typically includes a housing defining a mixing chamber with inlets for receiving calcined gypsum and water, among other additives well known in the art. The mixer includes an impeller or other type of agitator for agitating the contents to be mixed into a mixture or slurry. Such mixers typically have a rectangular discharge gate or slot with a cutoff block or door. The discharge gate controls the flow of slurry from the mixer, and is difficult to adjust to change slurry flow when product requirements change, such as when thicker or thinner wallboard is desired.

Foam and/or other additives are generally added through a foam slot on the outer side of the cut-off block and about 2–4 inches before the gate's connection to a vertical canister and a donut or restrictor ring. In the production of gypsum wallboard, a balance must be maintained in that the foam is uniformly mixed into the slurry, but not broken down from excessive agitation. Within the canister, which is approximately 5–7 inches in diameter, the material spins downward. The canister is employed to reduce the flow pressure of the slurry discharged from the mixer, which typically operates in the range of 270–300 rpm. One drawback of such canisters is that a centrifugal force set up within the canister causes separation between the materials in the mix due to density differences.

More specifically, recent studies have shown that a vortex is created as the mixture flows in the canister, which also creates an empty air space in the canister. Such an air space is typically representative of unwanted buildup of material in the canister, which then more easily sets and causes clogging of the apparatus. Clogged mixing equipment causes costly downtime for repairs.

Another disadvantage of the vortex created in the canister is that higher density slurry components become separated from the relatively lower density foam. Due to centrifugal force, the slurry is pushed to the sides of the canister and the foam tends to stay in the middle. Thus, rather than providing a site for the uniform mixing of the foam and the slurry, the canister appears to be doing the opposite.

From the canister and donut ring, the material typically flows into a flexible, generally horizontal distribution boot, from where it is dispensed onto the wallboard paper web traveling with the flow of material. In some applications, the slurry is dispensed upon a previously deposited layer of relatively denser gypsum slurry. If the pressure of the dispensed slurry is too high, the previously deposited layer is disturbed, resulting in a condition known as "washout".

Typically, a second facing is then applied on top of the slurry to constitute the second face of the gypsum board. Next, the sandwich passes through a forming station which determines the width and thickness of the gypsum board. This process is carried out in a substantially continuous operation, and the gypsum slurry begins to set immediately after the board is formed. Subsequently, the board is dried, cut and bundled into commercially acceptable lengths. Since the uniform mixing of foam within the slurry is a desired result in wallboard manufacture, in view of the drawbacks of the canister, the only places where the foam can mix with the slurry are the mixer gate and the flexible rubber boot.

Thus, it is an object of the present invention to provide an improved gypsum slurry mixing apparatus which does not require a canister.

Another object of the present invention of the present invention is to provide an improved gypsum slurry mixing apparatus and method which promotes uniform mixing of foam into the slurry.

Still another object of the present invention is to provide an improved gypsum slurry mixing apparatus and method which causes a reduction in slurry flow pressure prior to discharge of the mixture upon the wallboard paper and at the same time promotes even mixing of foam into the slurry.

A further object of the present invention is to provide an improved gypsum slurry mixing apparatus and method which reduces maintenance of mixing and dispensing equipment due to premature setting of the slurry.

A still further object of the present invention is to provide an improved gypsum slurry mixing apparatus and method which increases slurry/foam mixing time while not requiring additional length of the board production line.

Yet another object of the present invention is to provide an improved gypsum slurry mixing apparatus and method which provides an easily accessible mechanism for changing the volume of slurry emitted from the mixer.

BRIEF SUMMARY OF THE INVENTION

Accordingly, the above-listed objects are met or exceeded by the present apparatus and method for controlling the output of a slurry mixer including the features of eliminating the canister and its undesirable vortex and replacing it with an extended mixing and dispensing apparatus. The extended mixing and dispensing apparatus gate preferably includes an elongate, preferably flexible conduit which provides additional space for uniform mixing of slurry and additives such as foam, retarders, dispersants and accelerators. By providing a flexible mixing chamber in the conduit, unwanted premature setting of the gypsum is prevented so that occurrences of mixer or conduit lumps and/or paper breaks are reduced. Also, coiling of the chamber is available for applications in which there is limited space in the board line between the mixer outlet and the board forming plate. In the latter application, an extended length mixing chamber is provided which is applicable with board lines having limited space.

Another feature of the present invention is the inclusion of an adjustable pinch or concentric valve located in the preferably flexible conduit for regulating slurry flow to create backpressure in the mixer, which further enhances the uniform mixing action of the foam and slurry. This backpressure also keeps the mixer filled with slurry and thus prevents unwanted premature setting and clogging. When the valve is a concentric valve, it exerts a uniform pressure around the entire circumference of the conduit, which also reduces premature setting and clogging. Regardless of the type of valve, the use of a valve in association with the flexible conduit provides a convenient way to change the volume of dispensed slurry and thus adjust the thickness of produced wallboard as a result.

Yet another feature is the provision of a shock-absorbing device as a part of the conduit to reduce the force or pressure of the dispensed slurry upon the receiving web of substrate or previously dispensed slurry. In the preferred embodiment, the shock-absorbing device takes the form of a generally "S" or "C"-shaped double bend formation.

More specifically, an apparatus for delivering an additive-enhanced slurry for use in making gypsum wallboard, and configured for connection to a centrifugal mixer with a tangential discharge outlet, includes a conduit having a main inlet in slurry receiving communication with the mixer outlet and extending to a spout for discharging the slurry proximate a wallboard forming area. At least one volume restrictor is associated with the conduit for creating backpressure between the volume restrictor and the mixer outlet for keeping the mixer full, and at least one pressure reducer is associated with the discharge spout and configured for reducing the pressure of the slurry dispensed from the discharge spout. The apparatus is configured for maintaining a generally laminar flow from the mixer outlet to the discharge spout.

In the preferred embodiment, the dispensing apparatus is provided with at least one preferably adjustable valve for creating backpressure in the conduit and mixer, for controlling the flow of slurry from the spout and for reducing buildup of slurry in the apparatus and the mixer. It is preferred that the apparatus, including the preferably flexible conduit portion, be connected directly to the mixer outlet so that generally laminar flow is preserved from the mixer to the dispensing point on the wallboard production line.

In still another embodiment, a method for providing an evenly mixed additive enhanced slurry to a web is provided, including inserting calcined gypsum and water into a mixing chamber of a mixer through one or more inlets of the mixing chamber, agitating the contents of the mixing chamber to form an aqueous dispersion of the calcined gypsum, emitting the agitated contents from an outlet of the mixer, passing the agitated contents into a dispensing apparatus, introducing an aqueous foam into the mixture, creating a backpressure on the mixture in the apparatus by reducing the volume of mixture being emitted from a conduit of the apparatus, the back-pressure being created by constricting the conduit, and controlling the pressure of slurry and foam dispensed from the spout.

BRIEF DESCRIPTION OF THE SEVERAL VIEWS OF THE DRAWINGS

FIG. 1 is a fragmentary schematic overhead plan view of a mixing apparatus incorporating the features of the invention;

FIG. 2 is a side elevational view of a pressure reducing apparatus taken along the line 2—2 of FIG. 1 and in the direction indicated generally;

FIG. 3 is a front elevational view of the apparatus of FIG. 2;

FIG. 4 is a fragmentary side elevational view of an alternate to the structure shown in FIG. 2;

FIG. 5 is a fragmentary overhead plan view of a alternate embodiment of the apparatus of FIG. 1;

FIG. 6 is a fragmentary overhead plan view of another alternate embodiment of the apparatus of FIG. 1;

FIG. 7 is a fragmentary overhead plan view of still another alternate embodiment of the apparatus of FIG. 1;

FIG. 8 is a fragmentary overhead plan view of a further alternate embodiment of the apparatus of FIG. 1;

FIG. 9 is a section taken along the line 9—9 of FIG. 8 and in the direction indicated generally.

DETAILED DESCRIPTION OF THE INVENTION

Figure 10:
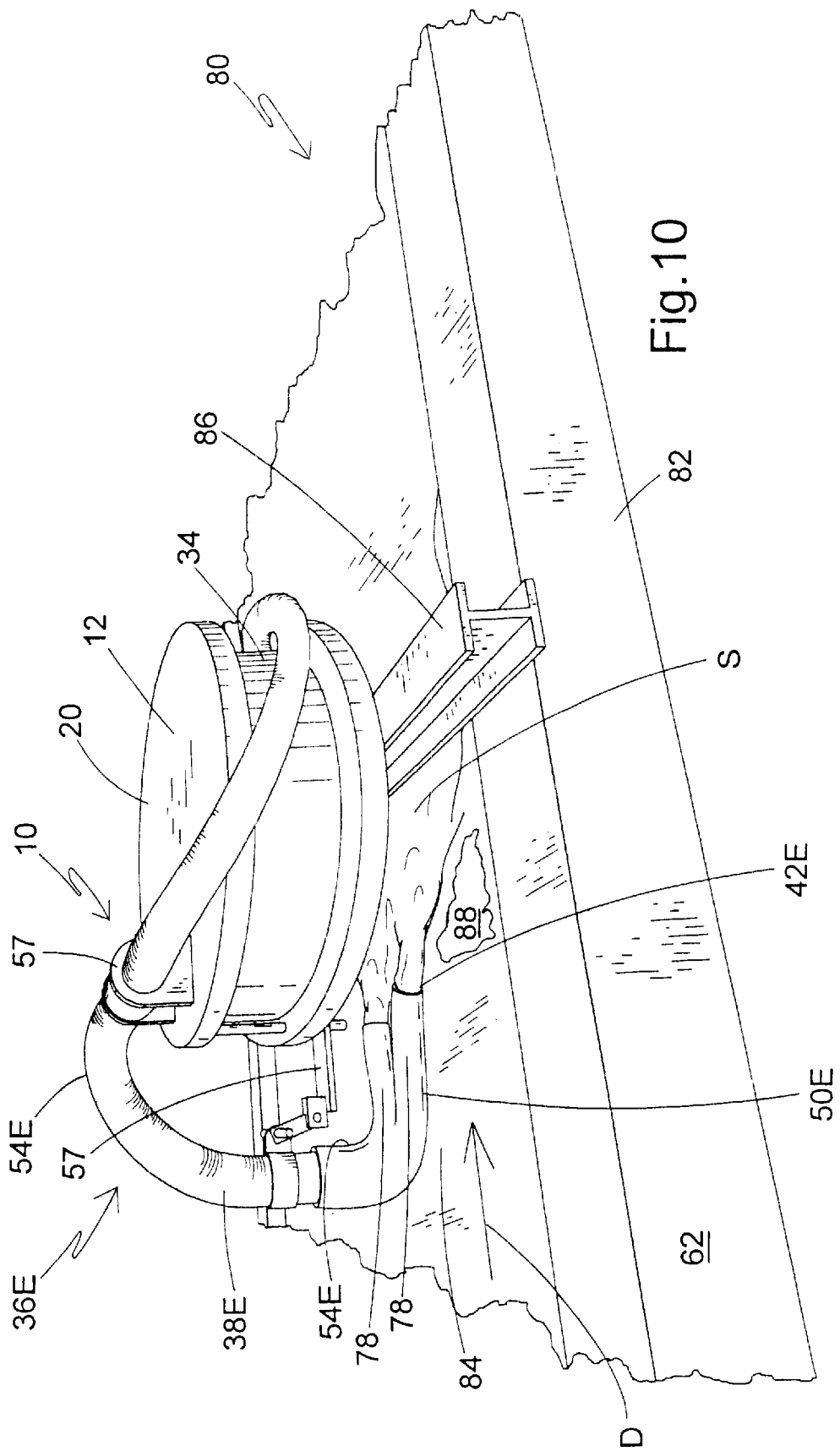
FIG. 10 is a fragmentary perspective elevational view of another alternate embodiment of the apparatus of FIG. 1.

Referring now to FIG. 1, a mixing apparatus for mixing and dispensing a slurry is generally designated 10 and includes a mixer 12 having a housing 14 configured for receiving and mixing the slurry. The housing 14 defines a mixing chamber 16 which is preferably generally cylindrical in shape, has a generally vertical axis 18, and upper radial wall 20, a lower radial wall 22 and an annular peripheral wall 24. An inlet 26 for calcined gypsum and an inlet 28 for water are both positioned the upper radial wall 20 proximate the vertical axis 18. It should be appreciated that the inlets 26, 28 are connected to gypsum and water supply containers respectively (not shown), such that gypsum and water can be supplied to the mixing chamber 16 by simple gravity feed. Also, as is well known in the art, other materials or additives in addition to gypsum and water, often employed in slurries to prepare gypsum products (e.g. accelerators, retarders, fillers, starch, binders, strengtheners, etc.) can also be supplied through these or other inlets similarly positioned.

An agitator 30 is disposed in the mixing chamber 16 and has a generally vertical drive shaft 32 positioned concentrically with the vertical axis 18 and extends through the upper radial wall 20. The shaft 32 is connected to a conventional drive source such as a motor for rotating the shaft at whatever speed is appropriate for agitating the agitator 30 to mix the contents of the mixing chamber 16. Speeds in the range of 275–300 rpm are common. This rotation directs the resulting aqueous slurry in a generally centrifugal direction, such as in a counter-clockwise outward spiral indicated by the arrow A. It should be appreciated that this depiction of an agitator is relatively simplistic and meant only to indicate the basic principles of agitators commonly employed in gypsum slurry mixing chambers known in the art. Alternative agitator designs, including those employing pins or paddles, are contemplated.

An outlet 34, also referred to as a mixer outlet, a discharge gate or a slot, is provided in the peripheral wall 24 for the discharge of the major portion of the well-mixed slurry into what is generally referred to herein as a mixing and dispensing apparatus 36. While conventional outlets are typically rectangular in cross-section, the present outlet 34 is preferably circular in cross-section, however other shapes are contemplated depending on the application. Also, while it is contemplated that the specific configuration of the mixer 12 may vary, it is preferred that the present mixer is of the centrifugal type commonly used in the manufacture of gypsum wallboard, and also of the type in which the outlet 34 dispenses the slurry tangentially to the housing 14. While conventional mixers typical provide a cutoff block at the outlet 34 to mechanically adjust the flow of slurry for the desired thickness of wallboard, typically ranging from ¼" to 1", it has been found that such a block often provides a site for the premature setting of gypsum, resulting in slurry buildup and eventual clogging and disruption of the production line.

Another drawback of conventional cutoff blocks is that when the gate is set for thick wallboard and a conversion is made to thin wallboard, where the block is disposed to permit relatively free flow of slurry from the outlet, insufficient backpressure is provided in the mixing chamber 16 which results in an incomplete and nonuniform mixing of slurry constituents. Also, inadequate backpressure results in dead spots or slow spots in the centrifugal internal flow in the mixing chamber 16, causing premature setup of the slurry and unwanted lumps in the mixture. In such instances, the wallboard line must be shut down for maintenance, causing inefficiencies in production.

The mixing and dispensing apparatus 36 includes an elongate, preferably cylindrical tube or conduit 38 and having a main inlet 39 in slurry receiving communication with the mixer outlet 34, and has an additive inlet 40 such as a nipple for the introduction of aqueous foam or other desired additive, such as retarders, accelerators, dispersants, starch, binders, and strength-enhancing products such as poly-phosphates, typically sodium trimetaphosphate, all of which are known in the wallboard art, after the slurry has been substantially mixed. It is desired that when foam is the additive, it is uniformly mixed in the slurry but not excessively agitated to the extent that it is broken down. As such, it is common to introduce the foam into the additive inlet 40 just after or downstream of, yet close to the outlet 34 and the main inlet 39 to prolong mixing time with the slurry. However, depending on the particular application, it is contemplated that the additive such as foam may be introduced at other places along the apparatus 36.

It is preferred that the mixing and dispensing apparatus 36 be in the range of at least 48 inches (120 cm), however it is contemplated that the length may vary depending on the particular application and the constraints of the particular gypsum wallboard production line. The extended length of the mixing and dispensing apparatus 36 is desirable for providing time for the foam to mix uniformly with the slurry after the point of additive introduction, and prior to dispensing the slurry upon a wallboard forming area such as the web of wallboard paper or upon a previously dispensed layer of relatively denser gypsum slurry, also deposited upon a web of wallboard paper. Since the preferred application for the present invention is a gypsum wallboard production line, the gypsum slurry with additives is commonly dispensed or discharged upon such a web.

A feature of the present mixing apparatus 10 is that the conduit 38 is placed in fluid communication with the outlet 34 downstream from the introduction of foam at the inlet 40, and includes a discharge spout 42 for dispensing the slurry upon the web as described above. The conduit 38 is preferably a flexible hose of rubber or rubber-like material (although rigid conduits are contemplated) and is of sufficient length to provide extra time for the foam or other additive to become more uniformly mixed within the slurry. While rigid conduits are also contemplated, best results have been obtained using hoses which are double reinforced to avoid kinking, preferably having a smooth inner surface, and being dimensioned in the range of 1½–3 inches (3.75–7.5 cm) inner diameter. Other diameters are contemplated to suit the application. In the present invention, a preferably relatively rigid additive inlet portion 44 bearing the inlet nipple 40 is in the approximate range of 6–24 inches (15–60 cm), and with the preferably flexible conduit 38, has a total length at least in the approximate range of 50 to 168 inches (125–420 cm), while longer lengths are contemplated, such as when increased slurry residence time is desired for more complete mixing. It is contemplated that in some applications, the additive inlet portion 44 is also made of flexible, rubber-like material and is in the shape of a hose. When the additive inlet portion 44 and the conduit 38 are made of dissimilar materials, they are joined to each other with adhesives, clamps, ultrasonic welding or other known fastening technologies in a way which will provide a smooth transition and which minimizes internal obstructions which might provide a site for the collection and premature setting of slurry.

As discussed above, another drawback of conventional gypsum slurry mixing apparatuses is that a canister is required downstream of the discharge gate to evenly mix the foam with the slurry and to reduce the slurry pressure. Another goal of the present invention is to eliminate the canister and its inherent problems. Accordingly, the present mixing and dispensing apparatus 36 is configured to maintain a generally laminar flow of the slurry from the main inlet 39 to the discharge spout 42 without a flow disrupter in the nature of the prior canisters. In the present invention, "laminar flow" is understood to mean a smooth, non-spiraling pipe flow that maintains full cross-sectional area of the conduit 38 through which it passes. This is in contrast to the turbulent flow of the prior canisters, in which uneven mixing of additives and slurry often occurred.

As will be described below, the flexibility of the present mixing and dispensing apparatus 36, and specifically the conduit 38 permits coiled or serpentine configurations that extend the length of the mixing chamber 16, and thus increase the residence time in which the foam and/or other additive can completely mix with the slurry without requiring a longer production line. Unlike conventional wallboard mixing apparatuses, in the present invention the conduit 38 of the mixing and dispensing apparatus 36 is directly connected to the gate portion 44, and ultimately to the outlet 34 without intervening devices such as a canister. Also, the preferably flexible construction of at least a portion of the conduit 38 reduces the tendency for gypsum to prematurely set up in the interior and cause undesirable clogging.

Another feature provided in some embodiments of the present mixing apparatus 10 is at least one flow restrictor 46 associated with the mixing and dispensing apparatus 36 for creating backpressure in the gate and ultimately in the mixing chamber 16, for controlling the flow of slurry from the spout 42 and for at least reducing and generally preventing the buildup of slurry in the gate and the mixer. In the preferred embodiment, the restrictor 46 is of the type which exerts an even, circular or concentric clamping force on the flexible conduit 38. Also, the preferred restrictor 46 exerts its clamping force on the exterior of the conduit 38, so that an internal passageway of the conduit is not obstructed by valve components.

The preferred restrictor 46 is a dynamically adjustable valve, i.e., is adjustable while the mixer 12 is in operation and slurry is being emitted from the spout 42, and is taken from the group consisting of pinch valves, muscle valves, concentric valves, iris-action valves and butterfly valves. In some low-pressure applications, simple hose clamps are also suitable. It is contemplated to use a transition between a larger diameter hose to a smaller diameter hose section as the restrictor 46 for reducing the volume of dispensed slurry, and for creating backpressure. For best results, the valve 46 is located on the conduit 38 near the spout 42 to provide the most efficient use of the length of the conduit for complete mixing of the foam into the slurry, however other locations farther from the spout are contemplated depending on the application.

Referring now to FIGS. 1–3, a further feature of the present mixing apparatus 10 is a pressure reducing apparatus 50 in the mixing and dispensing apparatus 36 for reducing the pressure or force of the slurry being dispensed from the spout 42. A typical mixer 12 of the type used with the present invention generates a slurry velocity in the approximate range of 700–2200 ft/min, measured at the discharge gate or outlet 34 with a corresponding force or pressure. Unless this force or pressure is reduced significantly, the force of the output of the spout 42 will disrupt the distribution of the previously deposited slurry, causing the above-described "washout", and will result in uneven wallboard. Thus, the pressure reducer 50 is needed so that the discharge from the spout 42 is acceptably slow and even.

In the preferred embodiment, the pressure reducer 50 is disposed in close association with the spout 42 and generally defines a pair of right angle bends 52, 54 in the conduit 38. It is also contemplated that approximate right angles may be suitable in certain applications, such as where the mixer outlet pressure is relatively lower. While the present pressure reducer 50 is generally "S"-shaped when viewed from the side (the opposite side shown in FIG. 2), it may also be "C"-shaped (FIG. 10), the objective is to cause the flow of slurry in the conduit 38 to undergo at least one and preferably at least two approximate right angle deflections prior to exiting the spout 42. Each successive right angle deflection will further reduce the output pressure of the slurry measured at the spout 42. It has also been found that positioning the conduit 38 to have an upwardly extending portion causes gravitational forces to reduce the pressure of the slurry.

Between the right angle portions 52, 54 is a preferably vertical transition leg 56. It has been found that slurry buildups between the portions 52, 54 are reduced when the transition leg 56 is more vertical. If the transition leg 56 is oriented at more than a 10° angle from vertical, the potential for slurry buildup will increase.

As seen in FIG. 3, the spout 42 is slightly flared from the diameter of the hose 40. It is recommended that the diameter of the pressure reducer 50 is at least equivalent to the diameter of the conduit 38 to facilitate even slurry flow. In addition, sufficient brackets 57 (best seen in FIG. 10) should be provided to support the conduit 38 as well as the pressure reducer 50 to prevent buildups and premature setting of slurry in the pressure reducer due to the resulting backpressure intentionally caused by this pressure reducer shape.

Referring now to FIG. 4, an alternate pressure reducer configuration is designated 50', and basically represents a structure where the angled portions 52' and 54' are greater than right angles to form a "hump" shape for reducing slurry flow pressure.

It is contemplated that the pressure reducer 50 is made of a flexible polymeric material which is compatible with the conduit 38 and is securely and sealingly fastenable thereto by chemical adhesives, epoxy, sonic welding, heat staking or equivalent polymeric fastening technology. For best results, the pressure reducer 50 is located downstream of the valve 46, with the valve between the pressure reducer and the outlet 34, although other arrangements are contemplated depending on the application.

Referring now to FIGS. 1 and 5–10, it will be seen that the present mixing apparatus 10 may be provided in a variety of mixing and dispensing apparatus 36 configurations, particularly in the arrangement and length of the conduit 38. In all of the embodiments described below, identical components are designated with corresponding reference numbers. Factors which influence the particular configuration of the conduit 38 employed include, among other things, the thickness of the wallboard being produced, the distance between the mixer 12, the mixer outlet 34 and the wallboard forming plate, and the particular characteristics of the slurry formulation, including the setting rate, the water/stucco ratio, glass fiber usage and the percentage of foam desired. Some of the present embodiments may be more successful than others, depending on the particular wallboard production line.

In all embodiments, it is preferred that any transitions or joints between hoses or components in the interior passageway 58 of the gate portion 44, the conduit 38 and or the pressure reducer 50 should be smooth and minimize steps or obstructions which tend to encourage slurry buildup. Also, during operation, it has been found that periods of low slurry flow volume tend to increase the potential for slurry buildup, and this can be regulated by restricting or closing down the valve 46, or using a smaller diameter conduit 38 and/or additive inlet portion 44.

In FIG. 1, the additive inlet portion 44 is relatively rigid and includes the inlet nipple 40. The flexible portion of the conduit 38 is secured to the additive inlet portion 44 in a way which minimizes internal obstructions, as is known in the art, and forms a loop 60 to provide a satisfactory amount of time for mixing in the foam into the slurry in applications where length is at a premium on the wallboard forming table 62 (best seen in FIG. 10) between the mixer 12, the mixer outlet 34 and the board forming plate (not shown) of the wallboard forming area.

Referring now to FIG. 5, the apparatus is generally designated 36a, features a curved gate portion 44a, and foam is introduced through an injection ring or block 64 (best seen in FIGS. 8 and 9). A plurality and preferably three foam injection ports 66 (best seen in FIG. 9) are employed for injecting foam into the main slurry flow passageway 58. A pressure sensor 70 is used to trigger the pinch valve 46, which is contemplated as being automatically or manually adjustable while the apparatus 10 is dispensing slurry. A wide mouthed bell formation 72 may be used to reduce slurry pressure, either alone or in conjunction with the pressure reducer 50 (FIG. 2).

Referring now to FIG. 6, a variation of the configuration of FIG. 1 is shown, and the apparatus is generally designated 36b, which features a conduit 38b fashioned into a zig-zag or "S"-shape when viewed from above. Note that in this embodiment, the spout 42 is approximately equidistant from an end 74 of the gate portion 44b. An advantage of the configuration of the conduit 38b over the conduit 38 is that additional length can be provided in a shorter distance from the mixer 12, which is useful in board lines in which space is at a premium. Also, in this embodiment it will be appreciated that the spout 42 is vertically displaced below the gate portion 44b and also below a main leg 76 of the conduit 38b. In developing space-saving configurations for the conduits 38, 38a, 38b, etc., care must be taken to avoid creating kinks which can cause flow disruptions or collect slurry and cause premature setting and clogging.

Referring now to FIG. 7, the apparatus is generally designated 36c and the conduit 38c is provided in a loop formation 60c which spirals up above the mixer 12. It will be appreciated that the loop formation 60c can as easily be spiraled below the mixer 12, depending on the application. It is contemplated that in some applications the conduit 38 may be bifurcated, with a pair of legs 78 provided prior to the attachment of the pressure-reducing portion 50.

Referring now to FIGS. 8 and 9, a mixing and dispensing apparatus 36d having a conduit 38d is shown with a relatively flexible gate portion 44d, feeding into the foam injection block 64 and then into the pressure sensor 70 and the concentric valve 46. A feature of the mixing and dispensing apparatus 36d is that the pressure reducer 50d, in defining its "S"-shape, has both a vertical and a horizontal displacement from the valve 46.

Referring now to FIG. 10, a mixing and dispensing apparatus 36e is shown disposed above a conventional gypsum wallboard line 80 including a conveyor table 82 upon which a web of face paper 84 is moved upon a conveyor in a direction designated by the arrow D. The mixer 12 is shown supported by a frame member 86, which can be any sort of frame or platform sufficient for supporting the mixer and other associated equipment as is known in the art.

The mixing and dispensing apparatus 36e is shown having sufficient length to wrap at least partially around the mixer 12. A feature of this embodiment is that the spout 42e is located upstream on the wallboard production line or table 82 of the mixer outlet 34, for applications with extremely limited space between the mixer 12 and the forming plate. When running the conduit hose 38e around the mixer 12, it is important to adequately support the hose, such as with the brackets 57, so that there are no dips or low areas along its path. As depicted in the embodiment of FIG. 7, a bifurcated pressure reducer 50e is shown with the pair of legs 78 and a 90° angle 54e. The other angle 54e is located above and to the rear of the mixer 12. This embodiment also lacks the valve 46. Slurry S is shown being dispensed from the spout 42e upon the web of paper 84, which may be provided with a layer of previously deposited denser gypsum slurry 88 (shown fragmentarily). In all of the embodiments, to ensure that slurry buildups are not occurring, it is recommended that operators periodically squeeze the conduit 38 and/or the spout 42, such as every 15 minutes or so.

In operation, it will be seen that a system for providing an evenly mixed slurry to a web is provided, including inserting calcined gypsum and water into the mixing chamber 16 through one or more inlets 26, 28 of the mixing chamber, agitating the contents of the mixing chamber to form an aqueous dispersion of the calcined gypsum, emitting the agitated contents from the outlet 34 of the mixer 12, passing the agitated contents into the main inlet 39 of the mixing and dispensing apparatus 36, 36a–e, introducing an aqueous foam into the mixture at the gate, preferably through the inlet nipple 40, creating a backpressure on the mixture in the gate by constricting the area of mixture being emitted from the flexible conduit 38, 38a–e of the gate, the backpressure being created by constricting the conduit 38, such as with the valve 46, and controlling the pressure of slurry and additive dispensed from the spout 42, 42c, 42e such as by the pressure reducer 50 in its various configurations. In the preferred embodiment, the slurry pressure is reduced by being forced to change direction approximately 90° at least once and preferably twice.

Where possible, the flexible conduit 38 extends generally directly down the board line. The longer the conduit 38, the more even is the mixing of the foam with the slurry. It is contemplated that the conduit 38 may extend linearly at least as much as 60 inches (150 cm) past the mixer 12. For board line applications where there is insufficient space before the forming plate is encountered, a set-up as depicted in FIG. 10 is recommended. The benefits of improved foam/slurry mixing achieved by the present invention include: reduction and/or elimination of blisters in the board; uniformity of the board, leading to improved strength; and potential water reduction from the board formulation, which in turn will led to energy savings in the kiln or an increase in line speed.

While specific embodiments of the slurry mixer outlet of the present invention have been shown and described, it will be appreciated by those skilled in the art that changes and modifications may be made thereto without departing from the invention in its broader aspects and as set forth in the following claims.

What is claimed is:

1. An apparatus for delivering an additive-enhanced slurry for use in making gypsum wallboard, and configured for connection to a centrifugal mixer with a tangential discharge outlet, comprising:

a conduit having a main inlet in slurry receiving communication with the mixer outlet and extending to a spout for discharging the slurry proximate a wallboard forming area;

at least one volume restrictor associated with said conduit for creating back pressure between said volume restrictor and the mixer outlet for keeping the mixer full; and at least one pressure reducer associated with said discharge spout and configured for reducing the pressure of the slurry dispensed from said discharge spout;

wherein said apparatus is configured for maintaining a generally laminar flow from the mixer outlet to said discharge spout.

2. The apparatus of claim 1 wherein said conduit has at least one inlet between said main inlet and said discharge spout for receiving at least one additive, and is of sufficient length for obtaining uniform mixing of the at least one additive with said slurry prior to dispensing of the slurry from said spout.

3. The apparatus of claim 2 wherein said conduit has a length of at least approximately 48 inches.

4. The apparatus of claim 2 wherein said conduit is flexible and can be curved to provide sufficient length for providing satisfactory additive/slurry mixing time without increasing overall distance between the mixer and the wallboard forming area.

5. The apparatus of claim 1 wherein said spout is located upstream of the mixer on a wallboard production line.

6. The apparatus of claim 1 wherein said conduit is of sufficient length to wrap at least partially around said mixer.

7. The apparatus of claim 1 wherein said at least one volume restrictor is at least one dynamically adjustable valve configured for creating back pressure in the mixer, for controlling the flow of slurry from said spout and for reducing buildup of slurry in said apparatus.

8. The apparatus of claim 7 wherein said at least one valve is taken from the group consisting of pinch valves, muscle valves, concentric valves, iris-action valves, hose clamps and butterfly valves.

9. The apparatus of claim 1 wherein said pressure reducing apparatus generally defines a pair of approximate right-angle bends in said conduit.

10. The apparatus of claim 9 wherein said pressure reducing apparatus is "S"-shaped.

11. The apparatus of claim 9 wherein said pressure reducing apparatus is "C"-shaped.

12. The apparatus of claim 1 wherein said conduit is bifurcated near said spout.

13. The apparatus of claim 1 wherein said conduit is a hose.

14. The apparatus of claim 13 wherein said conduit is of sufficient length to wrap at least partially around the mixer prior to dispensing the slurry.

15. The apparatus of claim 1 wherein said at least one additive is taken from the group consisting of aqueous foam, retarders, accelerators, starch, binders, strength-enhancers and dispersants.

16. In a wallboard manufacturing system, a mixing apparatus for mixing and dispensing a slurry onto a wallboard forming surface, comprising:

a centrifugal mixer having a housing configured for receiving and mixing slurry components, having a discharge outlet at a tangent to said housing;

a conduit in fluid communication with said outlet and having a spout for discharging the slurry;

said conduit including an additive inlet portion in fluid communication with said outlet, and having at least one inlet for receiving at least one additive;

at least one volume restrictor on said conduit for restricting the volume of the slurry dispensed from said spout; and at least one pressure reducer associated with said spout and configured for reducing the pressure of the slurry dispensed from said spout;

said conduit being configured to maintain laminar flow of the slurry from said outlet to said spout, and being provided with a sufficient length for enhancing uniform mixing of the at least one additive and the slurry.

17. The apparatus of claim 16 wherein at least a portion of said conduit is a flexible hose.

18. The apparatus of claim 16 wherein said at least one volume restrictor is at least one dynamically adjustable valve.

19. A method for providing an evenly mixed additive enhanced slurry to a web, comprising:

inserting calcined gypsum and water into a mixing chamber of a mixer through one or more inlet of the mixing chamber;

agitating the contents of the mixing chamber to form an aqueous dispersion of the calcined gypsum;

passing the agitated contents from an outlet of the mixer into a slurry dispensing apparatus including a conduit;

introducing an additive into the mixture in the slurry dispensing apparatus and mixing the additive with the slurry;

creating a back-pressure on the mixture in the apparatus by reducing the volume of mixture being emitted from the conduit, said back-pressure being created by constricting the conduit; and controlling the pressure of the additive enhanced slurry dispensed from a spout of the conduit.

20. The method of claim 19 wherein said pressure is controlled by causing said mixture to change flow direction approximately 90° at least one time.

21. The method of claim 19 wherein said agitated contents are passed directly from said mixer outlet, through said conduit and out the spout in a way that maintains laminar flow.

* * * * *